Figure 1:
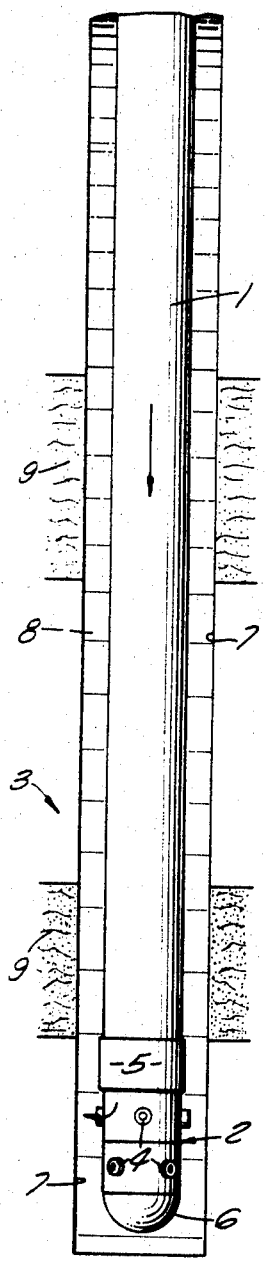

July 9, 1968 — I. T. HAVENS — 3,391,737
WELL CEMENTING PROCESS
Filed May 20, 1966

INVENTOR.
IRA T. HAVENS
BY
Lyon & Lyon
ATTORNEYS

United States Patent Office 3,391,737
Patented July 9, 1968

3,391,737
WELL CEMENTING PROCESS
Ira T. Havens, El Campo, Tex., assignor to Halliburton Company, Duncan, Okla., a corporation of Delaware
Filed May 20, 1966, Ser. No. 551,625
6 Claims. (Cl. 166—29)

This invention relates to a method of cementing a pipe in a well bore, and more particularly to the cementing of a pipe by jetting a slurry of cement against the well bore wall while continuously moving the pipe in the well bore.

In the completion of a well, it is customary to cement either a casing or other pipe to the wall of the well bore. One function of the cement, after it has set to a solid mass, is to prevent fluid communication between the earth formations penetrated by the well bore. However, in some instances, the cement bond has failed allowing fluid migration between earth formations to occur. In at least some of these instances, the failure has been due to poor contact between the cement and the wall of the formation. Such failure of the cement bond at the wall of the bore hole is due in part to a layer of drilling mud deposited on the bore hole wall during drilling operations. Various techniques have been used to improve the bonding of the cement to the wall. Wall scratchers or cleaners attached to a pipe mechanically scrape drilling mud from the wall by reciprocation or rotation of the pipe. Other methods of improving the receptivity of the formation wall to bonding include washing by circulating large quantities of water through the formation. However, none of these methods have been completely successful.

It is thus a primary object of the present invention to provide a method for forming a strong formation to cement bond in cementing a pipe in a well formation.

It is a further object of this invention to provide a continuous method of cleaning the wall of a well formation and simultaneously cementing a pipe within that formation.

It is a further object of this invention to provide apparatus for sealing a pipe in a wall formation with a strong formation to cement bond.

These and other objects of the present invention will be understood from the following description and drawings wherein:

FIGURES 1 to 4 are schematic views illustrating a well in longitudinal cross section, each figure illustrating a step in the process of this invention.

Briefly, the present invention comprises cementing a pipe in a well bore by placing a jetting tool on a drill pipe, tubing, casing, first string of multiple casing settings or other pipe and removing the mud filter cake on the wall of the well bore by hydraulic jet action of a cement slurry, filling the well bore with cement and setting the pipe therein. The use of cement jetting tools is known in the art as illustrated by U.S. Patent No. 3,052,298. Rotating jet tools, tools with rotating jets or any other suitable jet tool may be used. After the tool is placed on the pipe, it is then positioned below the deepest possible production zone in the formation and a long life cement is pumped down the pipe and out of the jets with a pressure great enough that the stream of cement jets against the bore hole wall removing all mud cake and debris and replacing it with cement. While cement is moving out of the jets, the pipe is pulled slowly upward causing the jetting tool to move across the desired zone to be cemented. After all important production or other zones have been jetted with cement, the pipe is run back to the bottom of the formation for permanent use.

FIGURE 1 illustrates a drilling pipe 1, with a jet tool 2 at its end within a well formation indicated generally by 3. Although only one jetting tool is illustrated, a pipe containing two or more tools may be used. The jet tool has jets 4 pointed in various directions and may include a float valve 5 or other suitable means for restricting back flow through the jets 4. A blank guide is indicated at 6. The walls of the formation 7 may be covered by drilling mud, filter cake, etc. The portion of the formation not occupied by the drill pipe may contain a liquid or other material 8 such as water, drilling mud, etc. Production zones are illustrated at 9.

Figure 2:
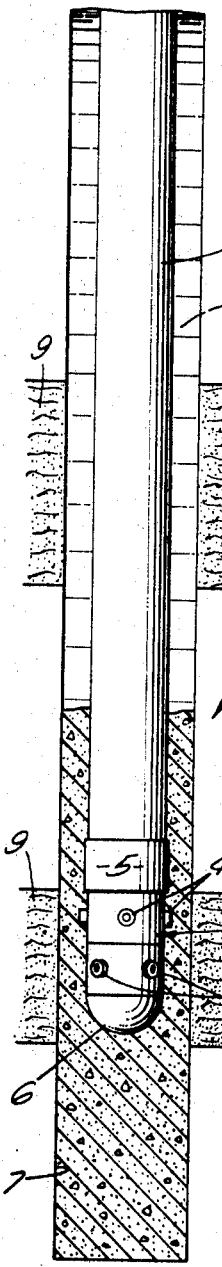

Cementing may be initiated when the pipe is in the position shown in FIGURE 1. Cement is pumped by a pump (not shown) down pipe 1 and out jets 4 so that it impinges against the wall of the formation. A high velocity jet of cement slurry of preferably about 100 feet per second, is desirable in order to hydraulically remove any mud cake and replace same with cement thereby providing a satisfactory bond between the cement and the formation. While continuing to jet cement against the wall of the formation, the pipe is slowly raised. FIGURE 2 illustrates the pipe and jet tool after is has been raised into the production zone. Cement 10 has already been deposited so that it covers the wall of the formation below the zone. The amount of cement deposited against or across the formation depends upon the pumping rate and the rate of raising the drill pipe. FIGURE 2 illustrates the well bore below the tool completely filled with cement. The actual amount of cement introduced during the jetting operation may vary as desired, as long as a sufficient amount of cement impinges against the formation wall so that it completely cleans the wall and leaves the bore hole below the tool filled with cement. During the jetting operation, the jetting tool should preferably be rotated to insure complete coverage of the entire wall. It is especially advantageous to rotate the tool when it is positioned in important zones such as the production zone indicated in FIGURE 2.

Figure 3:
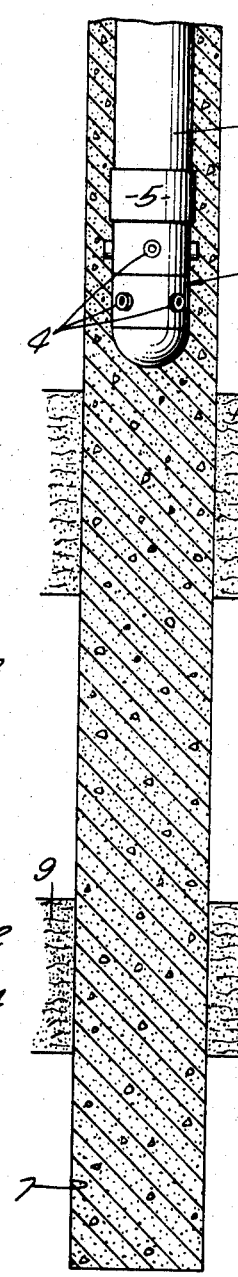

Cementing continues in this manner until the entire area desired to be cemented has been covered. Normally, this will include the area starting below the lowest production zone and extending above the highest production zone. This is illustrated in FIGURE 3 which represents the jet tool at a position above the highest production zone which may be the extent of cementing. If desired, however, cementing could continue to the top of the bore hole.

Figure 4:
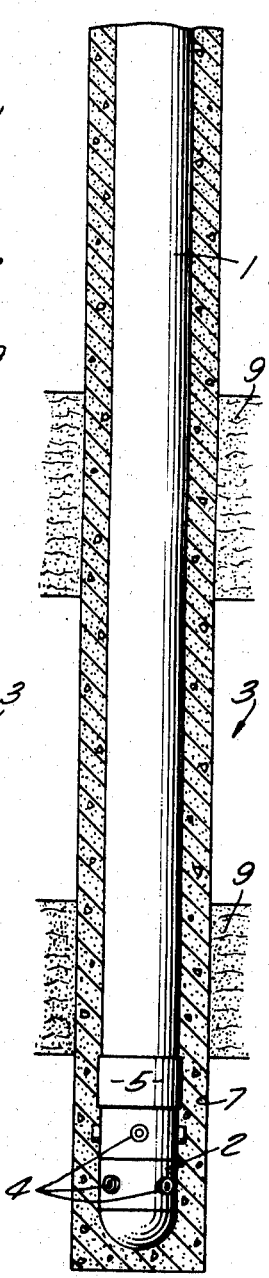

After the cementing operation has been finished, the pipe is run back to the bottom of the hole to be used as a permanent production casing. The permanent installation is achieved when the cement sets. FIGURE 4 illustrates the pipe in its final position. It will be noted that the jet tool is retained at the bottom of the pipe in the illustration. If desired, the pipe may be completely removed from the bore hole and the jet tool removed before the pipe is placed in its final position shown in FIGURE 4. Normally, however, it may be more convenient to leave the jet tool on the pipe rather than removing the entire pipe from the hole. Float valve 5 or other suitable means may be employed to prevent flow of the slurry into the pipe after jetting has stopped. Usually, this will be determined by the depth of the bore hole relative to the amount of wall cemented.

The method of this invention can be performed using conventional drilling equipment and techniques. For example, casing centralizers which insure centering the pipe in the hole may be used in this method. Also, a water wash or chemical wash ahead of the cementing operation can be advantageously used to remove thickened mud or reduce channeling and to further insure a good bond of the cement to the formation.

Any desired cement composition may be employed with the obvious proviso that the cement composition or slurry must be one that will remain fluid until the completion of the process. Thus, with some cement compositions and in jetting operations which will be carried on over an extended period of time, it may be necessary to introduce well-known retarders, dispersants, fluid loss additives, etc., into the cement. The amount of additive or additives used will, of course, also depend upon the temperature of the formation and other conditions. The tailoring of the cement to the setting conditions of the formation is well-known to those skilled in the art. In general most cements, including pozzolanic types may be used. Typical cement slurry compositions may contain bentonite and a retarder.

It may be advantageous to use a cement composition having a weight approximately the same as the mud. The jetted filter cake should thus add enough weight to the fluid outside the pipe to cause it to tend to flow back.

As the pipe is raised during the jetting operation, it may be necessary to break off sections of the pipe at the surface. The float valve 5 would then control backflow while making connections at the surface.

The method of this invention may be carried out as follows. A pipe having a diameter of 4½ inches is placed in a bore hole having a diameter of approximately 7⅞ inches. At the lower end of the pipe is placed a jetting tool comprising a section of pipe having four horizontal tungsten carbide jets of about 3/16" diameter spaced 90° apart. A blank guide is attached to the bottom of the jetting tool while a float valve is placed at the upper end of the jetting tool to prevent cement or other fluids from flowing back into the pipe during periods when the jetting is stopped. The pipe is run to a depth of 6,000 feet by adding pipe sections approximately 30 feet long.

A cement slurry is then pumped into the pipe. A typical cement slurry using API Class A cement is as follows:

Water—10.4 gallons/sack of cement (94 lbs.).
Bentonite—8% by weight of cement.
Low fluid loss additive—1% by weight of cement.
  52.5% hyroxyethyl cellulose, 80 mesh U.S. Sieve Series viscosity at 20° C, 2% aqueous solution, 225–235 centipoises.
  10% polyvinylpyrrolidone, 40,000 molecular weight.
  37.5% sodium salt of naphthalene sulfonate condensed with formaldehyde.
Retarder (calcium lignosulfonate)—0.6% by weight of cement.
Slurry density—13.1 pounds per gallon of water.

The cement slurry is added under a pressure of 500 p.s.i. at a pumping rate of one barrel per minute in order to obtain a jet velocity of 125 feet per second. The entire pipe is rotated at 10 revolutions per minute and slowly raised in the bore hole at a rate of 10 feet per minute. Jetting is intermittently terminated in order to remove sections of the drill pipe. Cement deposited in the bore hole is prevented from flowing back up the drill pipe by means of a float valve above the jetting tool which closes when jetting is stopped.

When the desired length of the bore hole has been jetted, the drill pipe is run back down to the bottom of the bore hole. The cement column extends about 1350 feet when the pipe is removed. When the pipe is lowered down into the cement, the cement is forced upward in the casing-well bore annulus and extends about 2000 feet when the casing is set in its final position. Thus, the well bore is cemented from a depth of 6000 feet to a depth of 4000 feet. The actual jetting requires about 2 hours and 15 minutes while about 45 minutes is required for disconnecting pipe joints. The time lapse during the entire jetting operation is thus approximately 3 hours. Because of the slow setting cement composition used, it is possible to position the pipe back in the bore hole before the cement sets. After approximately 12 hours the cement had become set.

In this operation, the jetting tool is left on the drill pipe when it is finally positioned at the bottom of the bore hole, the float valve preventing flow of cement into the drill pipe. However, after jetting has been ceased, the jetting tool could have been removed.

Having thus described my invention, it is intended that it be limited only by the lawful scope of the appended claims.

I claim:
1. A method of cementing a pipe in a well bore in such a manner to prevent fluid migration between earth formations, the steps comprising:
   lowering the pipe to a desired level in the well bore;
   jetting cement against the well bore wall substantially removing any mud cake thereon;
   raising the pipe during the jetting step thereby filling the well bore below with cement; and then re-lowering and placing the pipe in the cement in the well bore.
2. The method of claim 1 wherein the cement is jetted through at least one rotating jetting tool attached to the pipe which is used during the jetting step.
3. The method of claim 2 wherein the cement is substantially the same weight as the mud and contains a retarder and low fluid loss additive to slow the setting of the cement.
4. The method of claim 2 wherein the cement is substantially the same weight as the mud.
5. The method of claim 2 wherein the pipe is rotated at about 10 revolutions per minute and slowly raised at about 10 feet per minute while cement slurry is jetted at a velocity of at least about 100 feet per second.
6. A method of cementing a pipe in a well bore and preventing the migration of fluid between earth formations in and along the cemented portion of the well bore, the steps comprising:
   attaching at least one rotating jetting tool to the pipe;
   lowering the pipe to a desired level in the well bore;
   jetting cement having a retarder and a low fluid loss additive through a jetting tool at a velocity of at least 100 feet per second against the well bore wall substantially removing any mud cake thereon;
   rotating the jetting tool at about 10 revolutions per minute during the jetting step;
   raising the pipe and jetting tool at about 10 feet per minute during the jetting step thereby filling the well bore below with cement; and
   then re-lowering and placing the pipe in the cement in the well bore.

References Cited
UNITED STATES PATENTS

| | | | |
|---|---|---|---|
| 2,236,987 | 4/1941 | Bechtold | 166—29 |
| 2,295,803 | 9/1942 | O'Leary | 166—225 |
| 2,371,383 | 3/1945 | Dismukes | 166—27 |
| 2,646,360 | 7/1953 | Lea | 166—31 |
| 2,811,206 | 10/1957 | Klotz | 166—21 |
| 3,289,760 | 12/1966 | Kammerer | 166—21 |

JAMES A. LEPPINK, *Primary Examiner.*